G. W. MARBLE.
FILLER OR JUNK PLATE FOR THE CRANK CASES OF EXPLOSIVE ENGINES.
APPLICATION FILED MAY 11, 1907.
962,445.
Patented June 28, 1910.
2 SHEETS—SHEET 1.
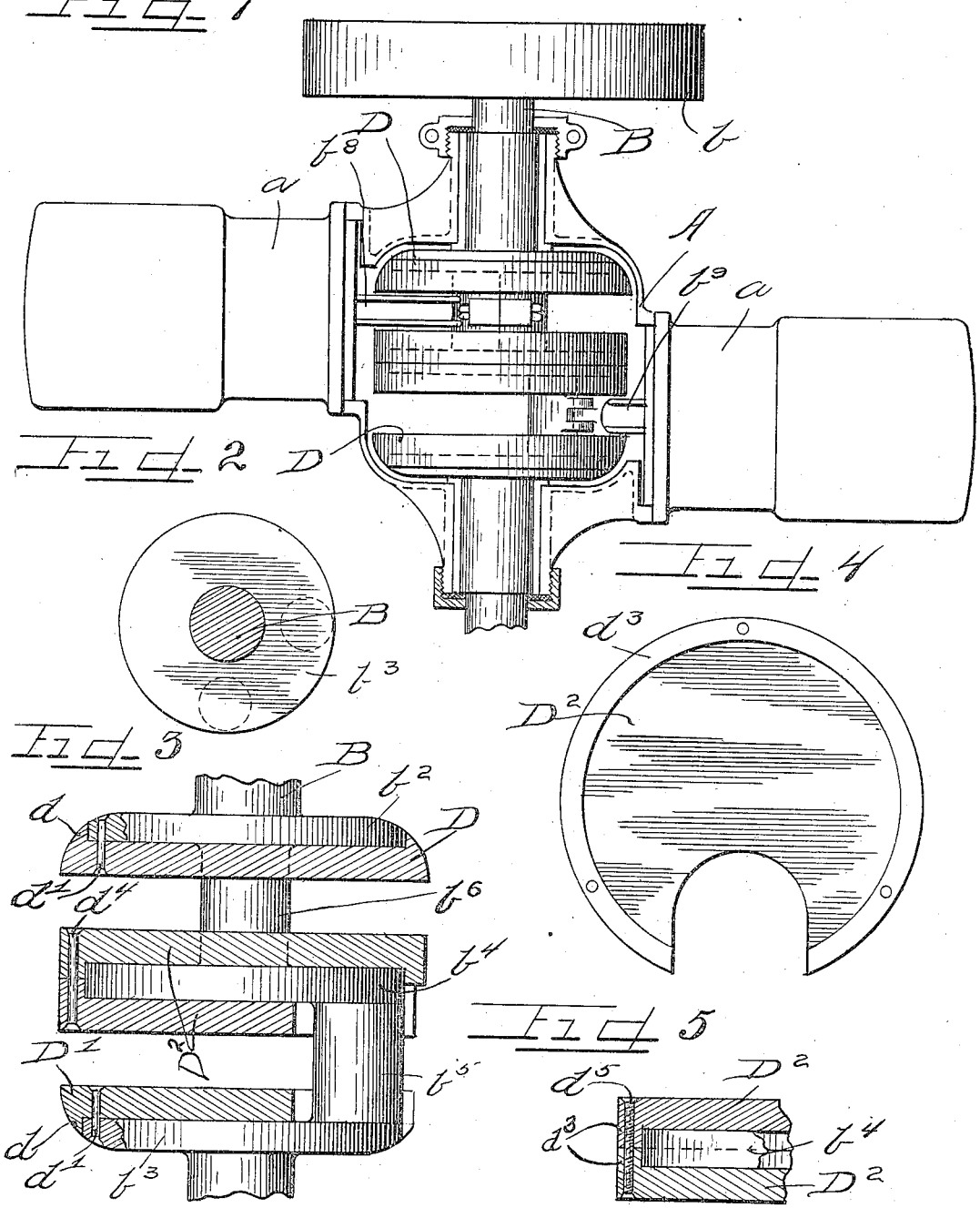

G. W. MARBLE.
FILLER OR JUNK PLATE FOR THE CRANK CASES OF EXPLOSIVE ENGINES.
APPLICATION FILED MAY 11, 1907.
962,445.
Patented June 28, 1910.
2 SHEETS—SHEET 2.
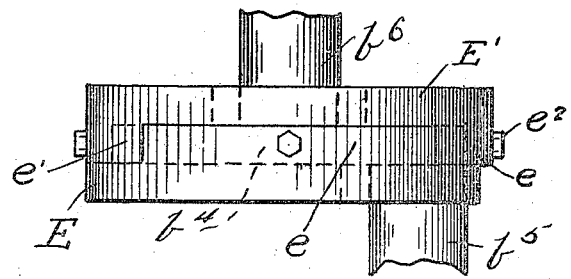
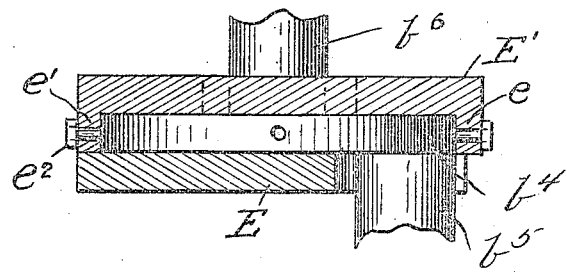
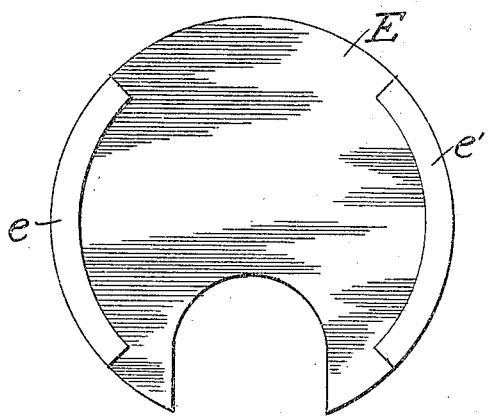

UNITED STATES PATENT OFFICE.

GEORGE W. MARBLE, OF CHICAGO, ILLINOIS, ASSIGNOR OF ONE-HALF TO WILLIAM R. DONALDSON, OF CHICAGO, ILLINOIS.

FILLER OR JUNK PLATE FOR THE CRANK-CASES OF EXPLOSIVE-ENGINES.

962,445.	Specification of Letters Patent.	Patented June 28, 1910.

Application filed May 11, 1907. Serial No. 373,189.

*To all whom it may concern:*

Be it known that I, GEORGE W. MARBLE, a citizen of the United States, and a resident of the city of Chicago, county of Cook, and State of Illinois, have invented certain new and useful Improvements in Filler or Junk Plates for the Crank-Cases of Explosive-Engines; and I do hereby declare that the following is a full, clear, and exact description of the same, reference being had to the accompanying drawings, and to the letters of reference marked thereon, which form a part of this specification.

This invention relates to improvements in explosive engines and more particularly to improvements in crank shafts therefor and means for securing junk or filler plates thereon to reduce the capacity of the crank case.

It is an object of the invention to provide within the crank case and secured upon the crank arms circular junk or filler plates which are concentric with the shaft and partially inclose the crank arms and fit closely in the crank case and which thereby reduce the capacity of the same to receive the mixture proportionately to their solid contents.

It is also an object of the invention to construct a crank shaft having disks for crank arms thereby enabling the same to be made light and comparatively thin.

It is a further object of the invention to afford in an engine of the class described a construction for the crank shaft and crank case which not only insures maximum strength in small compass but also insures high compression at a full charge.

This invention consists in the matters hereinafter described and more fully pointed out and defined in the appended claims.

On the drawings: Figure 1 is a top plan view of an engine embodying my invention with the cover of the crank case removed. Fig. 2 is a section taken through the shaft at one side of the crank and with the junk or filler plates removed. Fig. 3 is an enlarged horizontal section taken through the junk plates and showing the crank arm in plan. Fig. 4 is an enlarged detail view of one of the junk plates. Fig. 5 is a fragmentary sectional view illustrating the means for securing the junk plates to the crank arms. Fig. 6 is a plan view of a modified form of junk or filler plates secured to the crank arm. Fig. 7 is a horizontal section of the junk or filler plates with the crank arm in plan. Fig. 8 is a side elevation of one of the filler plates shown in Fig. 6.

As shown in the drawings: A indicates the crank case, on opposite sides of which are rigidly secured by bolting or other suitable means cylinders $a$, which, as shown, are arranged opposite each other on the crank case as is usual, with the opposed cylinder type of engines.

Journaled transversely in the crank case is the crank shaft B, provided on its outer end with a balance wheel $b$, and provided intermediate its ends and in the crank case with crank arms $b^2$ $b^3$ and $b^4$ which, as shown, are thin, circular disks integral with the shaft and constructed usually by turning the shaft and cranks from a solid blank though of course the shaft and crank arms may be formed by forging if desired. Wrist pins $b^5$ and $b^6$ are provided between said disk for engagement respectively in the usual manner by the connecting rods $b^8$ and $b^9$, which engage the respective piston pins in the cylinders.

Secured on the outer crank arms $b^2$—$b^3$ are junk or filler plates D—D', which are also circular and provided with a notch near the periphery to fit around the ends of the brasses of the connecting rod. Said junk plates are secured on the inner side of said crank arms and are provided with a peripheral flange $d$, which fits closely to the periphery of the crank arm and is rounded on the side adjacent the crank case to fit closely thereto. As shown, rivets $d'$ are used to secure the junk or filler plates to the crank arm.

Secured on the intermediate crank arm $b^4$ are junk plates $D^2$, which are duplicates and each adapted to fit to said crank arm and provided with a peripheral flange $d^3$, which is of a width approximately equal to half the thickness of the crank arm so that when secured in place as shown in Figs. 3 and 5, the crank arm is wholly inclosed therebetween. Said junk plates $D^2$ are secured in place by means of rivets $d^4$ which extend through the flanges $d^3$ as shown in Fig. 3. If preferred the rivets may be threaded and engaged in threaded apertures in said flanges as shown in Fig. 5, and then headed down at each end. In this construction the rivets $d^5$ hold the plates very securely in place.

In the construction disclosed in Figs. 6 to 8 inclusive the junk or filler plates E—E have mutually interfitting parts which firmly lock the same in place affording a very strong construction. Said junk or filler plates are each notched to receive the respective wrist pin $b^5$ or $b^6$ and each is provided with flanges $e$—$e'$ equal in width to the thickness of the crank arm $f^4$ and which engage in the notches between the flanges of the other plate providing interlocking joints. Each flange is provided with a suitable number of peripheral apertures, through which extend screws $e^2$ which thread into the periphery of the crank arm.

The crank case may be made considerably shorter than usual owing to the thinness of the crank arms and is shaped to fit closely to the sweep of the cranks affording no unnecessary space for loss of compression. The shaft if constructed with the cranks and wrist pins from a single blank is of great strength and the crank arms being disks concentric with the shaft may be made quite thin and light as the material is disposed most effectively to receive and transmit the impulse given it by the connecting rods, and are furthermore well braced by the junk plates. The junk plates fitting closely to the crank between the same fill all the space except sufficient for the connecting rod but yet permit a long brass to be used as the notches receive the ends of the brasses as shown in Figs. 1 and 3, thus in effect recessing the ends of the brasses into seats in the arms. The inwardly facing plates shown in Figs. 6 to 8 inclusive with the interlocking flanges afford great strength reducing the liability of loosening to a minimum and filling the crank case to the greatest possible extent.

Obviously when arranged and secured the junk plates can not become loose nor affect the balance of the engine, and reduce the waste space in the crank case to the smallest possible amount, thus greatly reducing the volume of mixture receivable within the case and insuring the desired compression thereof.

Obviously details of construction may be varied and I do not purpose limiting this application for patent otherwise than necessitated by the prior art.

I claim as my invention:

1. In a device of the class described a crank plate, junk or filler plates secured on each side of the crank plate having interlocking flanges adapted to engage around the periphery of the crank plate.

2. In a device of the class described a crank plate, junk or filler plates secured on opposite sides of the crank plate having inwardly directed flanges and means removably securing the plates in position.

3. The combination with a crank case and a crank shaft therein, of crank arms, a junk or filler plate secured on each crank arm adjacent the crank case, a junk plate secured on each side of the intermediate arm, each junk plate having a flange interfitting the flange on the opposite plate affording locked joints and all of said junk or filler plates filling the crank case except the space required for the connecting rod and affording a long bearing on the wrist pin.

4. A device of the class described comprising a circular crank arm, circular filler plates, one adapted to fit each side of said crank arm and provided with interlocking flanges fitting around the periphery of the crank arm and means extending through the flanges and engaging the periphery of the crank arm to rigidly secure the filler plates to the crank arm.

5. In a device of the class described the combination with a crank shaft, integral concentric crank disks secured thereto, wrist pins integral with the crank disks near the periphery thereof, an intermediate crank disk integral with said wrist pins and concentric with the aforesaid disks, of a junk or filler plate secured to each of the first named crank disks having a rounded flange fitting over the periphery thereof, and a junk or filler plate on each side of the intermediate crank disk provided with interfitting flanges.

In testimony whereof I have hereunto subscribed my name in the presence of two subscribing witnesses.

GEORGE W. MARBLE.

Witnesses:
CHARLES W. HILLS,
K. E. HANNAH.